US010268711B1

(12) United States Patent
Chappell et al.

(10) Patent No.: US 10,268,711 B1
(45) Date of Patent: Apr. 23, 2019

(54) IDENTIFYING AND RESOLVING DATA QUALITY ISSUES AMONGST INFORMATION STORED ACROSS MULTIPLE DATA SOURCES

(71) Applicant: Amazon Technologies, Inc., Seattle, WA (US)

(72) Inventors: Gregory Louis Chappell, Luxembourg (LU); Alexandros Zotos, Luxembourg (LU); Sean Michael Gregory Corrigall, Luxembourg (LU); Ben Jannis Freiberg, Trier (DE); Petar Butkovic, Luxembourg (LU); Vojtech Hordejcuk, Luxembourg (LU); Giannis Skevakis, Luxembourg (LU)

(73) Assignee: Amazon Technologies, Inc., Seattle, WA (US)

(*) Notice: Subject to any disclaimer, the term of this patent is extended or adjusted under 35 U.S.C. 154(b) by 508 days.

(21) Appl. No.: 15/006,835

(22) Filed: Jan. 26, 2016

(51) Int. Cl.
*G06F 17/30* (2006.01)
*G06F 3/0484* (2013.01)

(52) U.S. Cl.
CPC .... *G06F 17/30303* (2013.01); *G06F 3/04842* (2013.01); *G06F 17/30522* (2013.01); *G06F 17/30554* (2013.01)

(58) Field of Classification Search
CPC .......... G06F 17/30303; G06F 3/04842; G06F 17/30522; G06F 17/30554; G06F 11/14; G06F 11/16; G06F 11/08
See application file for complete search history.

(56) References Cited

U.S. PATENT DOCUMENTS

| 6,606,744 B1* | 8/2003 | Mikurak | H04L 29/06 |
| | | | 717/174 |
| 7,124,101 B1* | 10/2006 | Mikurak | G06Q 10/06 |
| | | | 705/35 |
| 8,032,409 B1* | 10/2011 | Mikurak | G06Q 10/00 |
| | | | 705/14.39 |
| 9,913,100 B2* | 3/2018 | Agarwal | G01C 21/206 |
| 9,922,345 B2* | 3/2018 | Mikurak | G06Q 10/087 |
| 2006/0235831 A1* | 10/2006 | Adinolfi | G06Q 40/00 |

(Continued)

OTHER PUBLICATIONS

Brady et al., Some new thoughts on Conceptualizing perceived service quality: A hierarchical Approach, 17 pages (Year: 2001).*

*Primary Examiner* — Noosha Arjomandi
(74) *Attorney, Agent, or Firm* — Lee & Hayes, P.C.

(57) ABSTRACT

The techniques described herein are directed to identifying data quality issues within information stored across multiple different data sources. For instance, the data quality issues can comprise missing values, inconsistent values, and un-translated values. Once identified, the techniques implement actions to resolve the data quality issues so that consumption or use of the information stored is improved. In at least one example, the identification and resolution of a data quality issue can be implemented in response to receiving a query that identifies an object. Based on the query, the system can collect values, from the multiple different sources, for attributes that have been defined for an item. The system can use algorithms (e.g., a comparison algorithm) to identify a data quality issue and can output a graphical user interface that visually distinguishes between attributes with a data quality issue and attributes without a data quality issue.

20 Claims, 10 Drawing Sheets

(56) References Cited

U.S. PATENT DOCUMENTS

| | | | | |
|---|---|---|---|---|
| 2012/0290527 A1* | 11/2012 | Yalamanchilli | ... | G06F 17/30563 707/602 |
| 2013/0031044 A1* | 1/2013 | Miranda | ... | G06N 5/025 706/47 |
| 2013/0066913 A1* | 3/2013 | Flasko | ... | G06F 17/30994 707/776 |
| 2013/0173600 A1* | 7/2013 | Edwards | ... | G16H 40/20 707/722 |
| 2013/0275393 A1* | 10/2013 | Kaldas | ... | G06F 17/30303 707/692 |
| 2014/0317066 A1* | 10/2014 | Hadzic | ... | G06F 17/30303 707/690 |
| 2015/0134591 A1* | 5/2015 | Staeben | ... | G06F 17/30864 707/602 |
| 2015/0324162 A1* | 11/2015 | Kim | ... | G06F 3/1438 345/169 |
| 2015/0348076 A1* | 12/2015 | Mondragon | ... | G06F 17/30303 705/7.34 |
| 2015/0379051 A1* | 12/2015 | Tang | ... | G06F 17/30303 707/691 |
| 2016/0162507 A1* | 6/2016 | Gupta | ... | G06F 17/30303 707/692 |
| 2016/0210427 A1* | 7/2016 | Mynhier | ... | G16H 50/20 |
| 2016/0217419 A1* | 7/2016 | Majumdar | ... | G06Q 10/10 |
| 2016/0379158 A1* | 12/2016 | VanderMolen | ... | G06Q 10/087 705/7.41 |

* cited by examiner

| 902 | 904 | 906 900 | 908 | 910 | 912 |
|---|---|---|---|---|---|
| DATA SOURCE ID | OBJECT ID | CATEGORY | ATTRIBUTE | CURRENT VALUE | NEW VALUE |
| DATA SOURCE 1 (AUSTRALIA) | 1234 | DIAPERS – COMPANY XYZ | QUANTITY | 12 | 24 |
| DATA SOURCE 2 (UNITED STATES) | 1234 | DIAPERS – COMPANY XYZ | QUANTITY | 12 | 24 |
| DATA SOURCE 3 (UNITED KINGDOM) | 1234 | DIAPERS – COMPANY XYZ | QUANTITY | 12 | 24 |
| DATA SOURCE 1 (AUSTRALIA) | 1235 | DIAPERS – COMPANY XYZ | QUANTITY | 12 | 24 |
| DATA SOURCE 2 (UNITED STATES) | 1235 | DIAPERS – COMPANY XYZ | QUANTITY | 12 | 24 |
| DATA SOURCE 3 (UNITED KINGDOM) | 1235 | DIAPERS – COMPANY XYZ | QUANTITY | 12 | 24 |
| DATA SOURCE 1 (AUSTRALIA) | 1236 | DIAPERS – COMPANY XYZ | QUANTITY | 12 | 24 |
| DATA SOURCE 2 (UNITED STATES) | 1236 | DIAPERS – COMPANY XYZ | QUANTITY | 12 | 24 |
| DATA SOURCE 3 (UNITED KINGDOM) | 1236 | DIAPERS – COMPANY XYZ | QUANTITY | 12 | 24 |

ACCEPT 914   REJECT 916   EDIT RULE 918

FIGURE 9

IDENTIFYING AND RESOLVING DATA QUALITY ISSUES AMONGST INFORMATION STORED ACROSS MULTIPLE DATA SOURCES

BACKGROUND

In today's digital world, an increasing amount of information associated with an object can be stored. As the object information is collected and/or created, quality issues often result. For instance, a first entity may create, collect, and/or provide first information that is associated with an object and a second entity may create, collect, and/or provide second information that is associated with the same object. The first information and the second information may be inconsistent with respect to one another. Alternatively, either the first information or the second information may be incomplete with respect to the other. This inconsistency and/or incompleteness can potentially cause data quality issues within the information that is created, collected, and/or provided for the object, and then subsequently stored in association with the object.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 9 is a diagram showing an example graphical user interface that can be presented via a display of a device. The graphical user interface can be generated in response to a rule being defined by a user so that the user can preview an effect of the rule prior to the system effecting changes to attribute values.

DETAILED DESCRIPTION

Figure 1:
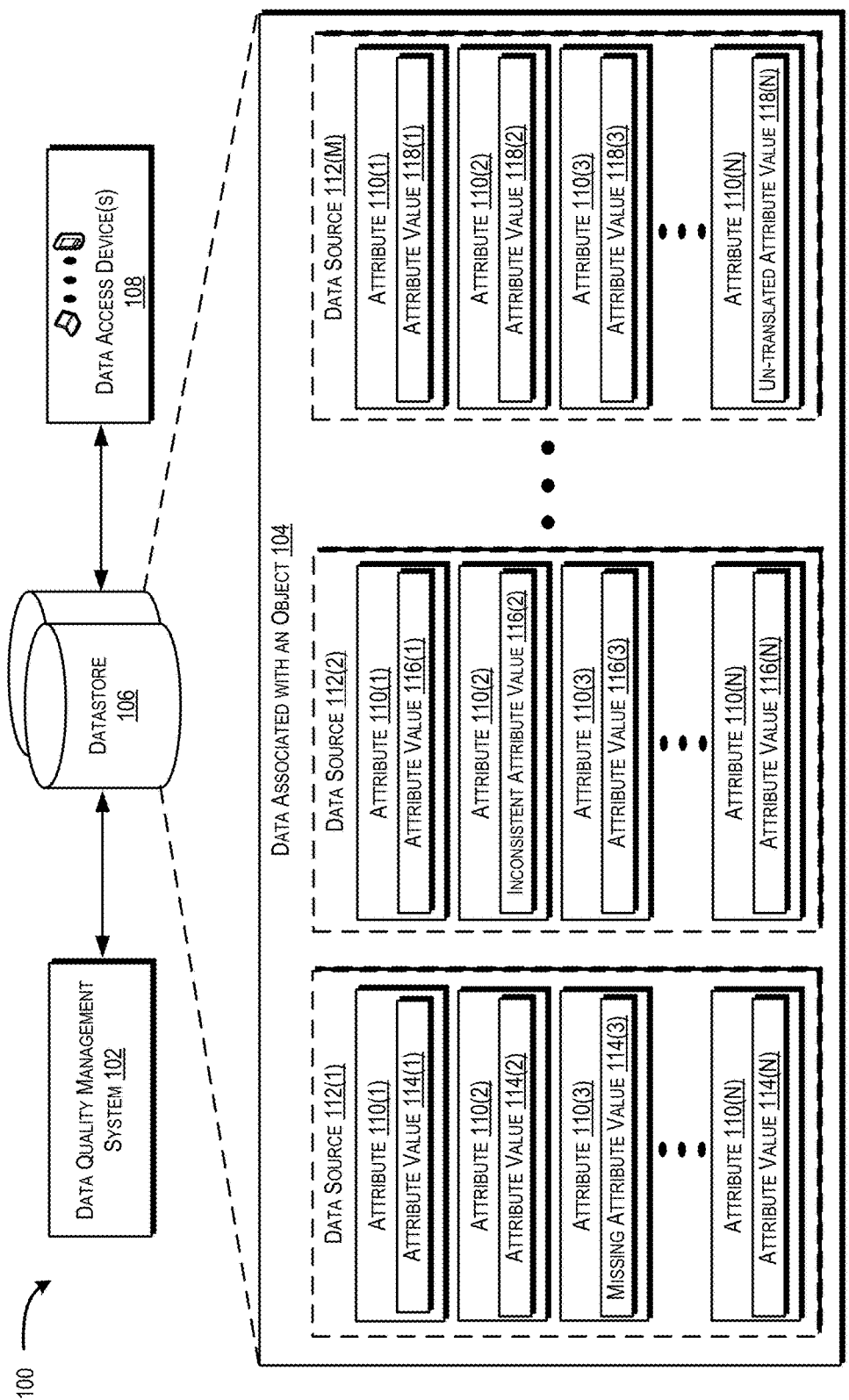
FIG. 1 is a diagram showing an example environment in which a data quality management system can identify a data quality issue amongst a plurality of different data sources, each data source individually containing data associated with an object.

This disclosure describes a system that identifies data quality issues amongst data stored in association with an object. The system then provides a tool to enable a user to resolve the identified data quality issues. An object can comprise a physical object, a place, a person, a digital object, a virtual object, a service, an item, and/or any other object for which information is created and/or collected, and subsequently stored. As described herein, the data associated with the object comprises a set of attributes that have been defined for the object. An individual attribute can comprise a piece of information that describes some characteristic or property of the object. Consequently, an individual object attribute can be populated or filled with one of a various number of different attribute values. For instance, an attribute can comprise information related to a physical dimension of an object (e.g., a "height" attribute populated with a value of six centimeters, twelve centimeters, etc.), an attribute can comprise information related to creation of the object (e.g., a "location" attribute populated with a city of creation, a "date of creation" attribute populated with a date the object was created, etc.), an attribute can comprise information related to how the object is displayed on a web page (e.g., a "title" attribute populated with a title of the object to be displayed within a field in response to a service call), etc.

The techniques described herein are directed to resolving data quality issues associated with inconsistency and incompleteness. In many cases, it can be beneficial for an entity that manages the data associated with an object to maintain separate, independent instances of the data as the data is created, as the data is received from external data contributors, and/or as the data is replicated. Thus, the exemplary system described below is configured to separately store individual ones of multiple sets of attributes for an object. As described herein, a "data source" is configured to contain an individual set of attributes defined for an object. For instance, a data source, over time, can create and/or collect (e.g., from various content providers) its own data set for the object. As an example, a data source can maintain and/or provide a data set that supports an online site that can be accessed by users, at least some attribute values of an object to be presented to the users via a Uniform Resource Locator (URL). In another example, a data source can maintain and/or provide a data set that supports warehouse and/or distribution center operations in which physical objects are stored, at least some attribute values of which relate to a size of a physical object (e.g., height, width, weight, quantity per package, etc.). Accordingly, a first data source can store a first set of the attributes defined for an object, a second source can store a second set of the attributes defined for the object, a third source can store a third set of the attributes defined for the object, and so forth.

One or more entities that create and/or manage the data can establish multiple data sources (e.g., distinguish one data source from the next) based on various factors. One example factor includes geographical regions. That is, a first data source can be established for a first geographical region and a second data source can be established for a second geographical region. The geographical regions can be established based on pre-defined boundaries (e.g., countries, states, provinces, counties, cities, zip codes, telephone area codes, etc.) or the geographical regions can be established by entity-defined boundaries (e.g., geographical regions can be created based on a point where the most commonly spoken language switched from a first language to a second language). As data sources are established, attribute values for a same attribute defined for an object may vary across multiple data sources. Alternatively, an attribute value of an attribute contained in a first data source may exist but the same attribute of a second data source may not contain an attribute value (e.g., an existing value has not effectively been replicated or copied and therefore the same attribute of the second source contains a missing value or a "null" value). This inconsistency and/or incompleteness can potentially cause data quality issues associated with consumption or use of the data.

Moreover, the techniques described herein are also directed to providing tools to enable a user to resolve a data quality issue associated with an attribute value of an attribute that has not been translated to a target language. For instance, a first data source can be established in a first geographical region within which most of the people speak a target language (e.g., a commonly spoken local language). However, the first data source may contain an attribute value for an attribute that is stored in a different language and not the target language. That is, the attribute value may have been copied from a second data source established in a second geographical region within which most of the people speak the different language. Accordingly, the system described herein is also directed to resolving data quality issues associated with un-translated attribute values.

To this end, the techniques described herein are directed to identifying data quality issues within information stored in association with an object across the multiple different data sources. The data quality issues can comprise missing attribute values, inconsistent attribute values, and un-translated attribute values. Once identified, the techniques implement actions to resolve the data quality issues so that consumption or use of the information stored in association with the object is improved (e.g., object data provided in response to a service call on a first data source is consistent with object data provided in response to a service call on a second data source, object data provided in response to a service call on a first data source is complete with respect to object data provided in response to a service call on a second data source, object data is provided in a target language in response to a service call, etc.).

In at least one example, the identification and resolution of a data quality issue can be implemented in response to receiving a query that identifies an object. Based on the query, the system can collect attribute values, from multiple different data sources, for attributes that have been defined for the object. The system uses algorithms (e.g., a comparison algorithm compares first characters/symbols of a first attribute value to second characters/symbols of a second attribute value) to identify a data quality issue. Then, a graphical user interface that visually distinguishes between attributes with a data quality issue and attributes without a data quality issue can be output. Consequently, a user that submits the query can effectively view all the object information collected from multiple data sources in one place and the user can efficiently be notified of a potential data quality issue within the object information and determine whether the data quality issue should be resolved. If necessary, the user can provide instructions to implement an action to resolve the data quality issue (e.g., fix the data quality issue). For example, the action can comprise copying an existing attribute value from a different data source to an attribute with a missing attribute value. In another example, the action can comprise replacing an inconsistent attribute value with an attribute value from a different data source (e.g., a consistent and correct attribute value). In yet another example, the action can comprise one of (i) translating an attribute value that is not currently stored in a target language of a data source or (ii) locating and copying an existing attribute value from a different data source that has already been translated to the target language.

In at least one additional or alternative example, the identification and resolution of a data quality issue can be implemented in association with a pre-defined rule that actively monitors for, and detects, data quality issues for one or multiple objects. The active monitoring and detecting can be ongoing and continuous such that it is implemented automatically based on the pre-defined rule.

FIG. 1 is a diagram showing an environment 100 in which a data quality management system 102 identifies data quality issues associated with an object and that resolves the identified data quality issues. Data associated with an object 104 can be stored in one or more datastore(s) 106 (referred to herein as the datastore 106). The datastore 106 can be controlled and operated by an entity, or multiple entities that work together to collect, create, and/or store information about an object. Accordingly, the datastore 106 can provide services (e.g., cloud storage services, cloud processing services, Web services, etc.) that support the maintenance of object information. As mentioned above, an object can comprise a physical object (e.g., a shoe, a computing device, a camera, a paperback book, etc.) or an object can comprise a digital object (e.g., a web site, an online article, a social media profile page, a technical document, an electronic book, a downloadable or stream-able movie or program, a downloadable or stream-able song, etc.). An object can additionally or alternatively comprise a service (e.g., a subscription service to an online site, a housecleaning service, a car repair service, etc.). Consequently, the datastore 106 is configured to provide the data associated with the object 104 to one or more data access device(s) 108 (referred to herein as a data access device 108), in response to a service call. In various examples, a service call comprises a request to view or access at least some of the data associated with the object 104.

The data associated with an object 104 includes a set of attributes 110(1) . . . 110(N) that have been defined for the object, where N is a positive integer number (e.g., 5, 10, 20, 50, 100, 1000, etc.). For instance, an attribute 110(1) can comprise information related to a physical dimension of a physical object (e.g., height of the object, width of the object, weight of the object, height of a package that contains the object, width of the package that contains the object, weight of a package that contains the object, etc.), an attribute 110(1) can comprise information related to creation of an object (e.g., an author of an article, a publication date, a manufacturer of a physical object, a date when the object is first offered for sale, etc.), or an attribute 110(1) can comprise a piece of information related to the object that may be displayed on a web site or a web page. For example, a network accessible item detail page can include a "title" of the object, a "price" of the object, "shipping information" for the object, a "customer return policy" for the object, a "product identification number", etc. The attributes can be defined for the object by an entity (e.g., an entity that controls and operates the data quality management system 102 and/or the datastore 106).

An individual set of attributes 110(1) . . . 110(N) can be stored in the datastore 106 in association with a data source. Thus, FIG. 1 illustrates data sources 112(1) . . . 112(M) each configured to contain the set of attributes 110(1) . . . 110(N) defined for the object, where M is a positive integer number (e.g., 2, 3, 5, 10, 15, 50, etc.). As described above, it can be beneficial for one or multiple entities that manage the data associated with an object 104 to maintain separate instances of the data as the data is created, as the data is received, and/or as the data is replicated. Thus, different data sources 112(1) . . . 112(M) can be established and object information can be accessed by a data access device 108 from any one of the data sources 112(1) . . . 112(M) (e.g., via a network connection). As an example, a first data source 112(1) can support a service (e.g., an online site or a web page) established within a first geographical region (e.g., a first country such as the United States) so that devices within the first geographical region can access, and/or be redirected to, first object data contained in the first data source 112(1). Continuing this example, a second data source 112(2) can support a different service established within a second geographical region (e.g., a second country such as Germany) so that devices within the second geographical region can access, and/or be redirected to, second object data contained in the second data source 112(2). In various implementations, the data associated with an object 104 can be stored, on behalf of the multiple data sources 112(1) . . . 112(M), together in a single location (e.g., a single datacenter). In other implementations, the data associated with an object 104 can be stored, on behalf of the multiple data sources 112(1) . . . 112(M), separately in different locations (e.g., attribute values of a first data source can be stored in a first datacenter, attribute values of a second data source can be stored in a second datacenter, and so forth).

The data individually contained by the data sources include attribute values of the attributes 110(1) . . . 110(N) defined for the object. An attribute value comprises one or more characters or symbols (e.g., numbers, letters, other symbols, or a combination thereof). For example, the first data source 112(1) respectively contains attribute values 114(1) . . . 114(N) for the attributes 110(1) . . . 110(N) (note that attribute 110(3) of source 112(1) contains a missing attribute value and therefore no information is stored therein). Similarly, the second data source 112(2) respectively contains attribute values 116(1) . . . 116(N) for the attributes 110(1) . . . 110(N), and the $M^{th}$ data source 112(M) respectively contains attribute values 118(1) . . . 118(N) for the attributes 110(1) . . . 110(N).

As described above, the data quality management system 102 is configured to identify data quality issues within the data stored in association with the object 104. In a first example, a first type of data quality issue is associated with a missing attribute value 114(3) (e.g., a "null"). The data quality management system 102 can identify the missing attribute value 114(3) by determining that no attribute value is stored in association with a particular attribute and/or by comparing the information stored amongst the data sources 112(1) . . . 112(M) to determine that other data sources (e.g., data source 112(2) and data source 112(M)) contain an attribute value for the attribute 110(3), while data source 112(1) does not contain an attribute value for attribute 110(3).

In a second example, a second type of data quality issue is associated with an inconsistent attribute value 116(2). The data quality management system 102 can identify the inconsistent attribute value 116(2) by comparing the information stored amongst the data sources 112(1) . . . 112(M) and determining that the attribute value for attribute 110(2) contained by data source 112(2) is inconsistent with other attribute values contained by other sources (e.g., data source 112(1) and data source 112(M) may store the same attribute value for attribute 110(2)).

In a third example, a third type of data quality issue is associated with an un-translated attribute value 118(N). The data quality management system 102 can identify the un-translated attribute value 118(N) by determining a target language associated with a data source 112(N) and by analyzing the attribute value 118(N) to determine that it is stored in a language other than the target language.

While the examples provided above explain three types of data quality issues, the techniques described herein can also or alternatively be implemented to identify and resolve other types of data quality issues as well.

Figure 4:
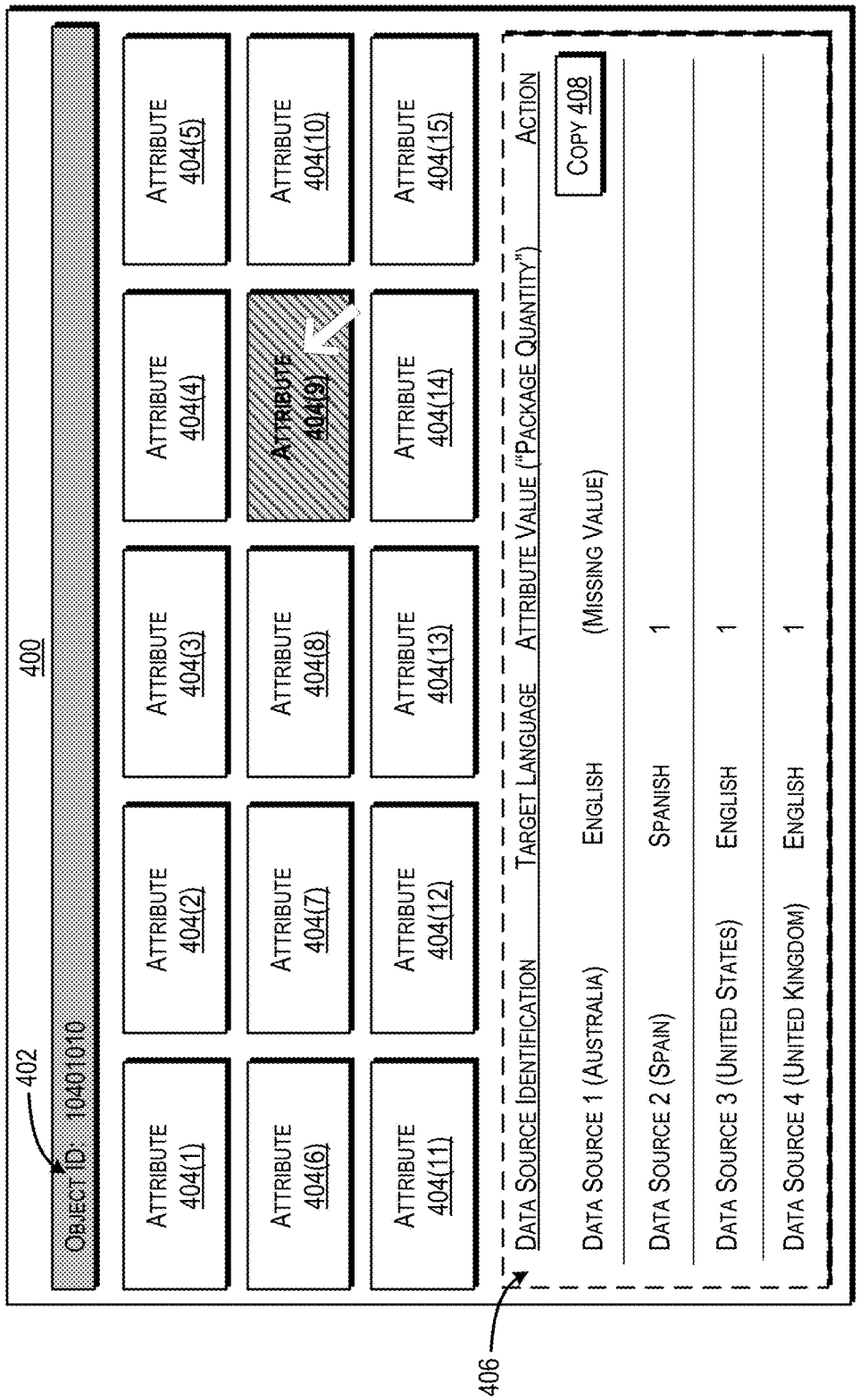
FIG. 4 is a diagram showing an example graphical user interface that can be presented via a display of a device and that is configured to distinguish between an attribute for which a data quality issue has been identified and an attribute for which a data quality issue has not been identified. The data quality issue illustrated in FIG. 4 comprises an attribute with a missing attribute value (e.g., without any attribute value) and the example graphical user interface in FIG. 4 presents an option to provide instructions to copy an attribute value to the attribute with the missing attribute value.
Figure 5:
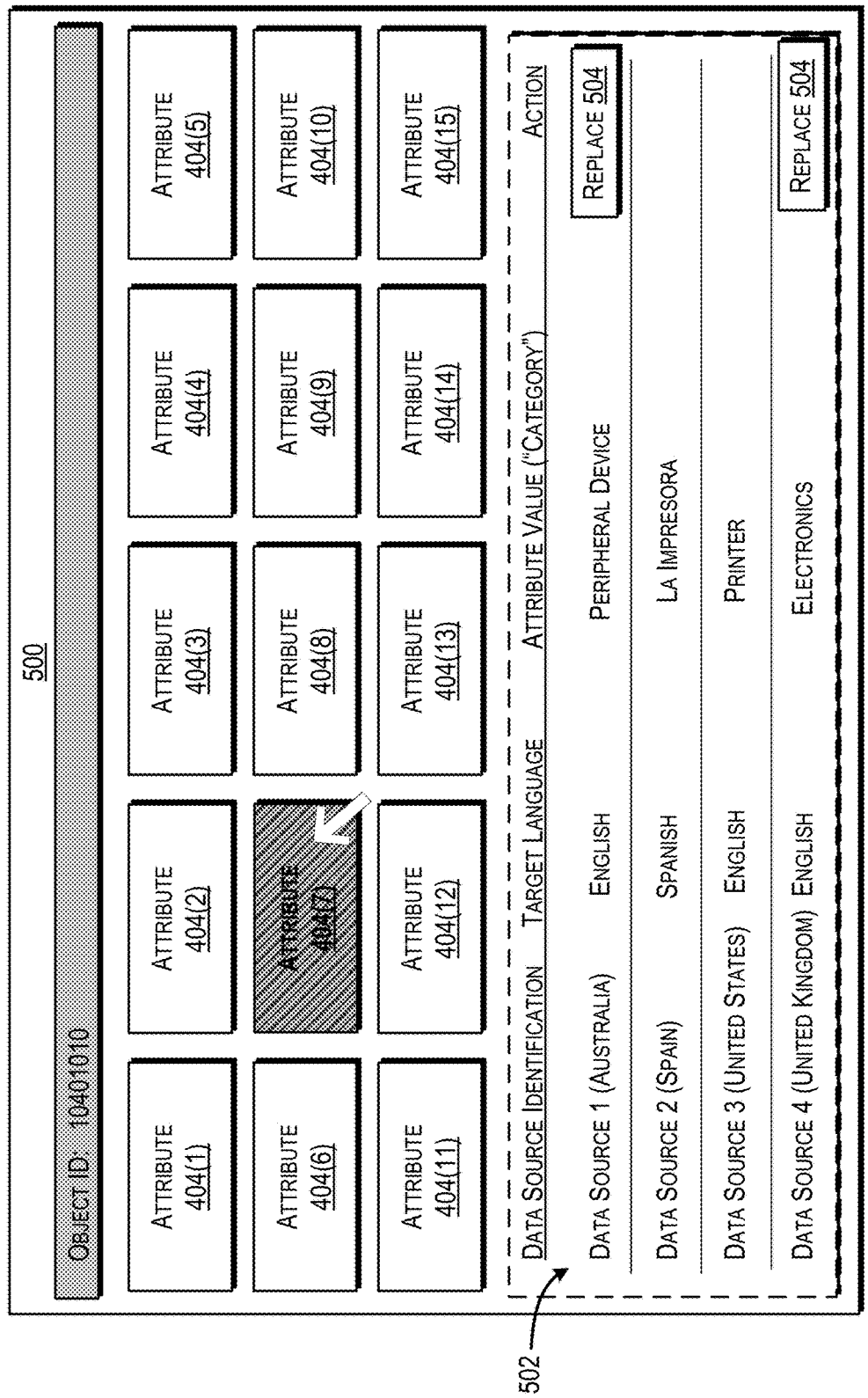
FIG. 5 is a diagram showing another example graphical user interface that can be presented via a display of a device and that is configured to distinguish between an attribute for which a data quality issue has been identified and an attribute for which a data quality issue has not been identified. The data quality issue illustrated in FIG. 5 comprises an attribute with an inconsistent attribute value and the example graphical user interface in FIG. 5 presents an option to provide instructions to replace the inconsistent attribute value with a different attribute value.
Figure 6:
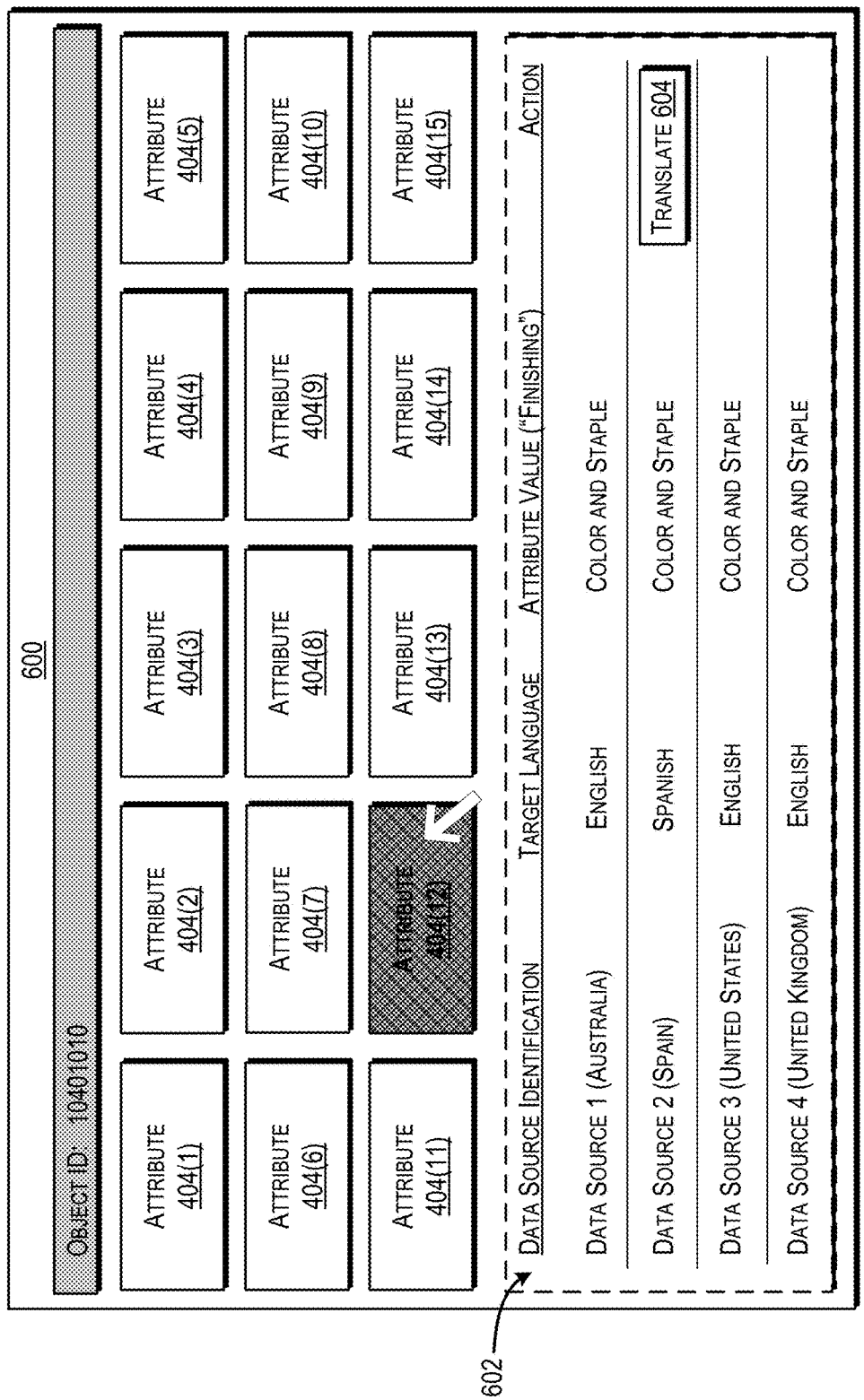
FIG. 6 is a diagram showing yet another example graphical user interface that can be presented via a display of a device and that is configured to distinguish between an attribute for which a data quality issue has been identified and an attribute for which a data quality issue has not been identified. At least one data quality issue illustrated in FIG. 6 comprises an attribute with an attribute value that has not been translated into a target language (e.g., an un-translated attribute value) and the example graphical user interface in FIG. 6 presents an option to provide instructions to translate the attribute value from a current language to the target language.

As further described in, and more specifically as illustrated in FIGS. 4-6, the data quality management system 102 is configured to generate graphical user interfaces that visually distinguish between (i) object attributes (e.g., attribute 110(2), attribute 110(3), attribute 110(N)) in which there potentially is a data quality issue amongst a plurality of different data sources 112(1) . . . 112(M) and (ii) object attributes (e.g., attribute 110(1)) in which there is no potential data quality issue identified amongst the plurality of different data sources 112(1) . . . 112(M). For instance, the values 114(1), 116(1), 118(1) stored in association with attribute 110(1) may be complete and consistent with respect to each other (e.g., the same number after conversions that account for differing metrics or units, the same or similar words after translations that account for different languages, etc.), and therefore, no potential data quality issue is identified across the multiple data sources for attribute 110(1). Or, the values 114(1), 116(1), 118(1) stored in association with attribute 110(1) may be the same or similar words or phrases that have already been respectively translated to a target language, and therefore, no potential data quality issue is identified across the multiple data sources for attribute 110(1).

By presenting the graphical user interfaces that visually distinguish between attributes with potential data quality issues and attributes without potential data quality issues, a user is empowered to view the data quality issues in a single, unified interface representing multiple different data sources, without having to directly interact with each data source through separate interfaces. Moreover, the single, unified interface provides functionality for the user to quickly effect a change that resolves a data quality issue by using attribute values from other data sources (e.g., an attribute value can be copied to a missing attribute value, a consistent attribute value can be used to replace an inconsistent attribute value, etc.). Consequently, an amount of time required of the user to otherwise examine each individual data source and take action to identify and resolve a data quality issue within each individual data source, is greatly reduced via the techniques described herein.

Consequently, a viewer of the graphical user interfaces can quickly discover, or be notified of, which attributes potentially have data quality issues, review the potential data quality issues, and make a determination on whether the data quality issues need to be resolved. In this example, the data quality management system 102 outputs graphical user interfaces for further review because, in some cases, it may be necessary to store attribute values that vary between data sources (e.g., there may be valid reasons for inconsistent values, missing values, or un-translated values). In this example, the data quality management system 102 surfaces "potential" data quality issues and brings them to the attention of a user to review and determine whether identified data quality issues really are data quality issues that should be resolved.

In various examples, the techniques described herein can be implemented in association with an entity that operates marketplaces in various geographical regions. For instance, the data sources 112(1) . . . 112(M) can support different marketplaces and the process of selling the objects across the multiple marketplaces (e.g., online electronic marketplaces) often involves one or more of: (i) obtaining information about an object from external manufacturers or external vendors of the object, (ii) obtaining the object from the external manufacturers or the external vendors of the object, (iii) presenting high quality object information across the multiple electronic marketplaces to improve the customer experience and make the customer experience more consistent, (iv) ensuring that a physical object is effectively and efficiently stored in distribution centers or warehouses proximal to shipping destinations (e.g., in multiple different geographical regions), and (v) providing (e.g., shipping) the object to customers in accordance with policies (e.g., corporation-defined policies for a geographical region, government-defined policies for a geographical region, etc.). Consequently, an entity that operates the multiple different marketplaces across a plurality of different geographical regions stores data associated with the objects it sells. The techniques described herein help ensure that high quality and accurate object information can effectively be stored across multiple different marketplaces.

In a specific example, a third-party vendor of an object in the United States may provide, to a first data source that supports the Unites States marketplace operated by an entity, a detailed and accurate description of an object. In contrast, a third-party vendor of the same object in Germany may provide, to a second data source that supports the German marketplace operated by the entity, a brief and possibly inaccurate description of the object. Because the description of the object provided by the third-party vendor in the United States is of a higher quality, other data sources supporting other marketplaces (e.g., Canada, France, United Kingdom, etc.) may adopt its use. Subsequently, the data quality management system 102 is configured to identify the lower quality description of the object in Germany as an inconsistent description (e.g., an inconsistent attribute value 116(2)) based on a comparison of attribute values stored in association with the "description" attribute across the multiple data sources that support the marketplaces. This identified data quality issue can be resolved by copying the higher quality description of the object to the second data source that supports the German marketplace (e.g., and translating it if necessary).

Figure 2:
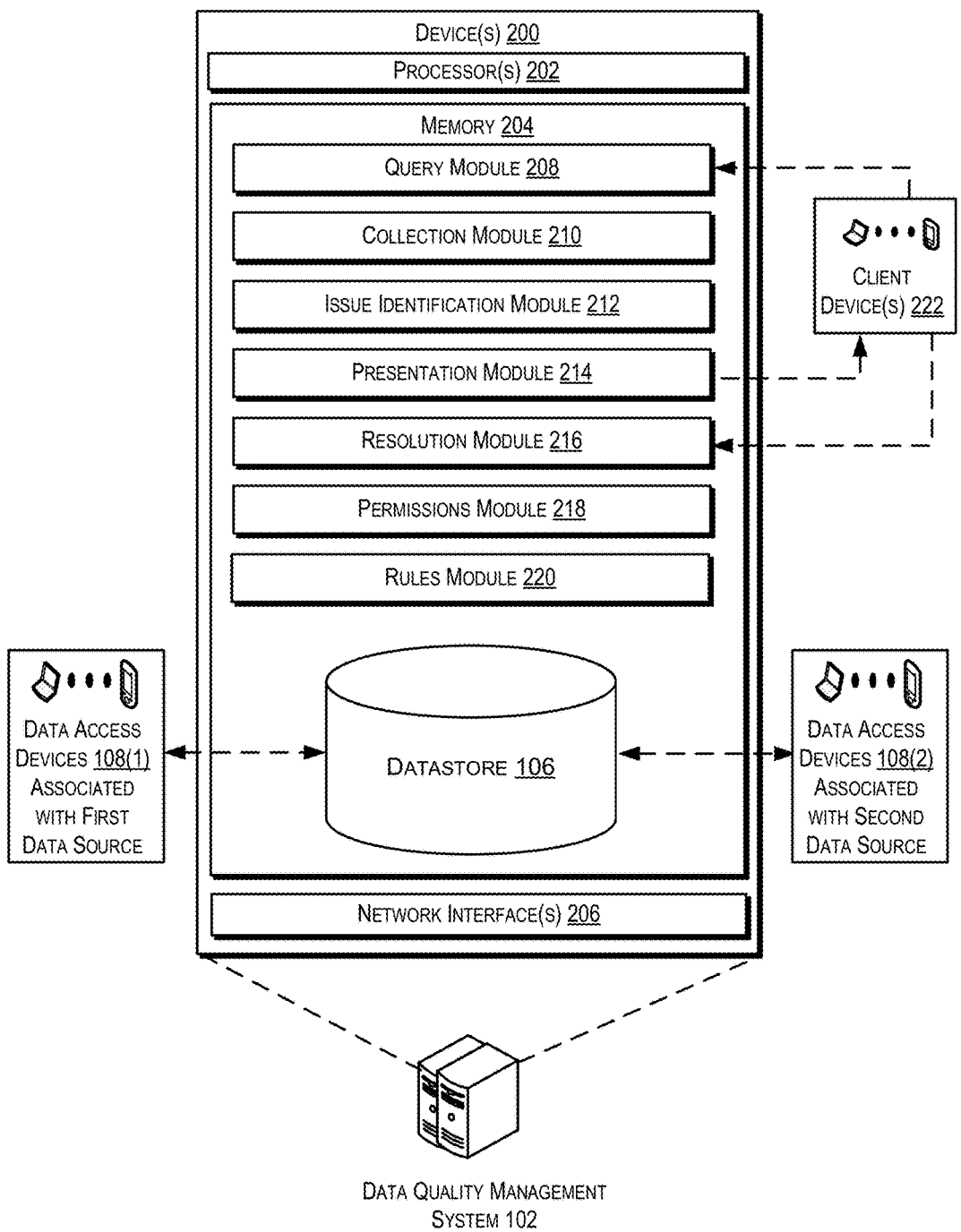
FIG. 2 is a diagram that shows additional details of the data quality management system that is configured to identify a data quality issue associated with an object and resolve the data quality issue.

FIG. 2 is a diagram that shows additional details of the data quality management system 102 introduced above with respect to FIG. 1. In various examples, the data quality management system 102 can be implemented in association with a service provider or a content provider (e.g., an entity configured to store data to be accessed or consumed). The data quality management system 102 comprises one or more device(s) 200, which include one or more processor(s) 202 and memory 204. A device 200 can be a server, such as a network-accessible server, or another electronic device, that can be accessed over a network connection (e.g., wired and/or wireless) via network interface(s) 206. Network(s) can comprise a wide area network (WAN), a local area network (LAN), a personal area network (PAN), a network specific to a datacenter (e.g., an Intranet, a storage area network (SAN)), etc. A network can also comprise switches that connect various devices to routers and/or other devices that can act as bridges between data networks (e.g., across various geographical regions).

In various examples, the processor(s) 202 execute one or more modules and/or processes to cause the device(s) 200 to perform a variety of functions, as set forth above and as explained in further detail below. In some implementations, the processor(s) 202 can include a microprocessor, a microcomputer, a microcontroller, a digital signal processor, a central processing unit (CPU), a graphics processing unit (GPU), etc. Among other capabilities, the processor(s) 202 can be configured to fetch and execute computer-readable instructions stored in the memory 204.

The memory 204 comprises computer-readable media and includes one or more modules or data structures including, for example, the query module 208, the collection module 210, the issue identification module 212, the presentation module 214, the resolution module 216, the permissions module 218, and the rules module 220. Each of the modules are further discussed herein with respect to the example processes and/or the example graphical user interfaces. As used herein, the term "module" is intended to represent example divisions of executable instructions for purposes of discussion, and is not intended to represent any type of requirement or required method, manner or organization. Accordingly, while various "modules" are described, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules can be implemented in whole or in part by hardware (e.g., a specialized processing unit, etc.) to execute the described functions. In various implementations, the modules described herein in association with the device(s) 200 can be executed across multiple devices. The one or more modules can be in the form of stand-alone applications, an operating system component, or any other application or software component having features that facilitate interactions between the device(s) 200 and other devices (e.g., the data access devices 108, the client devices 222 as further discussed herein, etc.).

The memory 204 can be non-transitory computer-readable media including, but not limited to, phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by an electronic device. In addition or as an alternative, the memory 204 can include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks.

Figure 3:
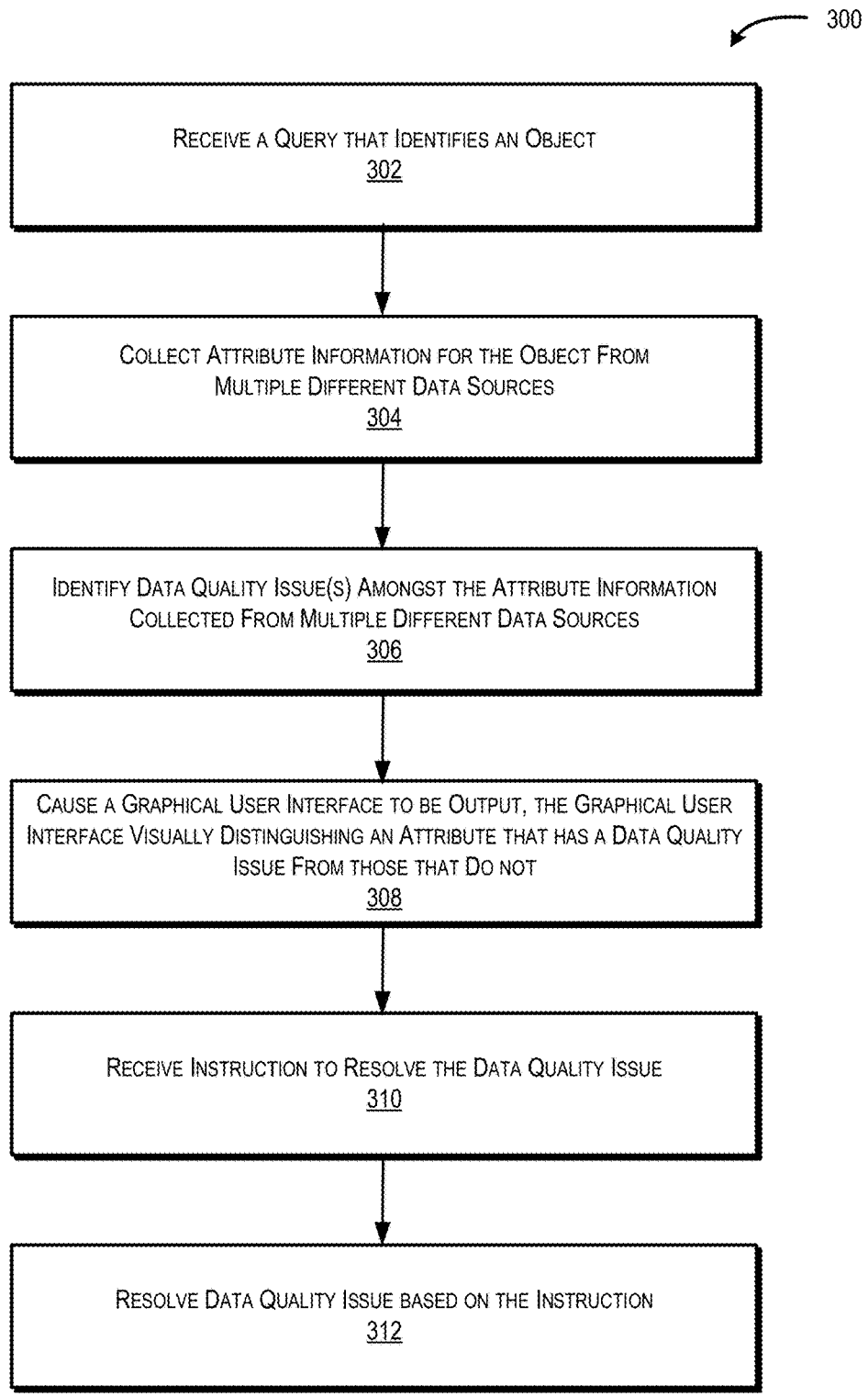
FIG. 3 is a flow diagram showing an illustrative process to identify a data quality issue associated with an object and resolve the data quality issue.
Figure 7:
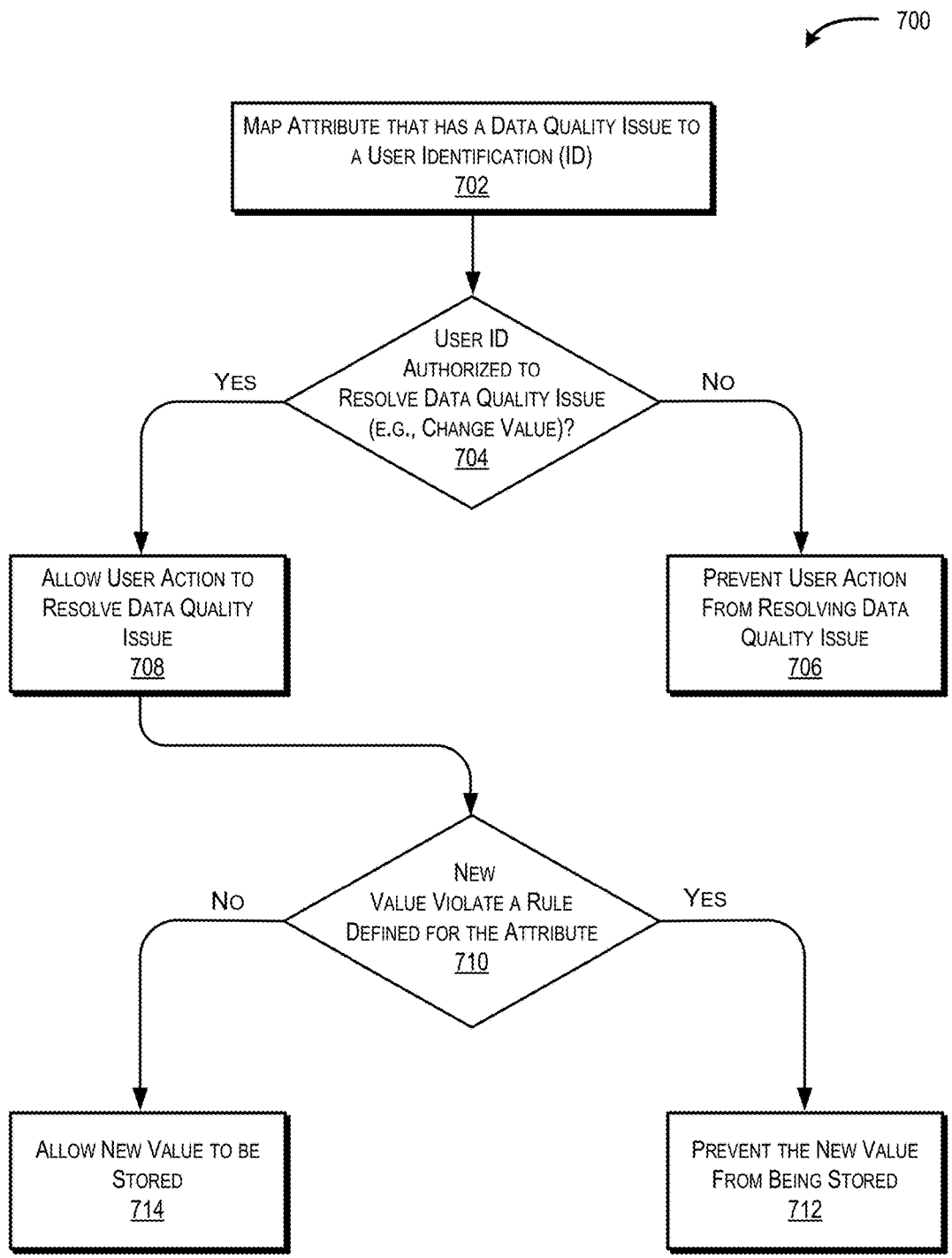
FIG. 7 is a flow diagram showing an illustrative process to determine whether a user is authorized to resolve a data quality issue and to determine whether a rule prevents a resolution of the data quality issue (e.g., whether a new attribute value violates a rule).
Figure 8:
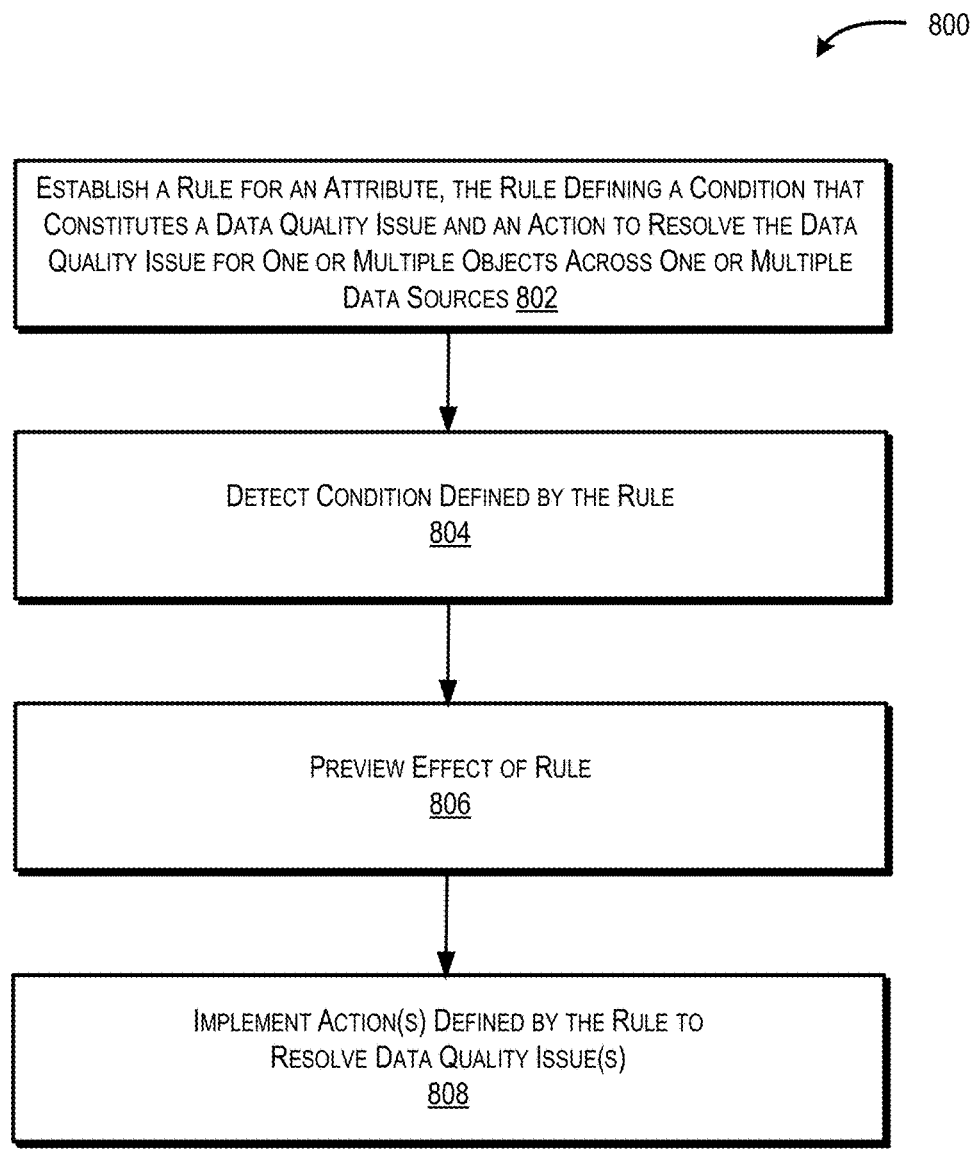
FIG. 8 is a flow diagram showing an illustrative process to define rules that can subsequently be used to identify and resolve data quality issues for an object or for multiple different objects.
Figure 10:
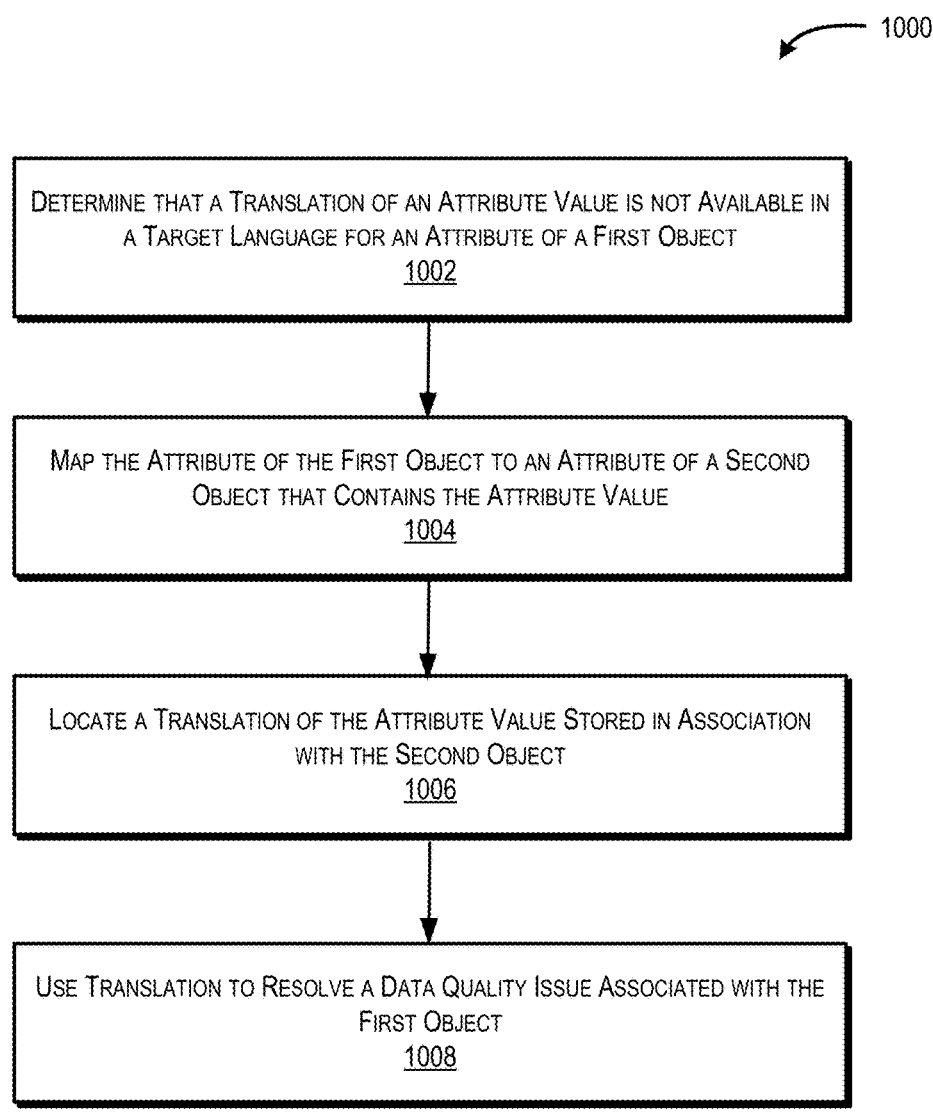
FIG. 10 is a flow diagram showing an illustrative process to match attribute values of an attribute across a first object and a second object so that a translation of an attribute value in a target language can be located.

FIG. 3, as well as FIGS. 7, 8, and 10, individually illustrate an example process for employing the techniques described herein. For ease of illustration, the example processes are described as being performed in association with the environment 100 of FIG. 1. Moreover, the example processes may be implemented by the data quality management system 102 further illustrated in FIG. 2. However, the example processes can be performed in other environments and by other devices and/or systems as well. The example processes are illustrated as logical flow graphs, each operation of which represents a sequence of operations that can be implemented in hardware, software, or a combination thereof. In the context of software, the operations represent computer-executable instructions stored on one or more computer-readable media that, when executed by one or more processors, configure a device to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations can be omitted.

FIG. 3 illustrates an example process 300 that identifies a data quality issue associated with an object based on a received query and resolves the data quality issue based on a received instruction.

At 302, a query that identifies an object is received. For instance, the query module 208 is configured to receive the query from a client device 222. In various examples, a user of a client device 222 can be a person (e.g., an employee or representative of an entity) tasked with managing and/or reviewing stored data for a plurality of objects that has been obtained and/or created, and ensuring the stored data is of the highest quality (e.g., has a reduced or limited amount of data quality issues). Accordingly, the query can include some sort of object identifier (ID), where the object ID can be specific to the entity (e.g., an entity-specific object identification) or a more general, universal identifier (e.g., an international standard book number (ISBN), a universal product code (UPC), etc.). A client device 222 can be any device that can request, receive, and present information via a network, including, without limitation, a personal computer device, a laptop computer device, a desktop computer device, a portable digital assistant (PDA) device, a mobile phone device, a smartphone device, a tablet computer device, an electronic book (eBook) reader device, a set-top box device, a game console device, a smart television device, or any other electronic device. In some examples, a client device 222 can be a server.

At 304, attribute information for the object identified in the query is collected from multiple different data sources. For instance, the collection module 210 is configured to use the object ID to access the datastore 106, search for, discover, and collect the data associated with the object 104 from multiple different data sources 112(1) . . . 112(M). Accordingly, the collection module 210 is configured to retrieve attributes 110(1) . . . 110(N) and the respective attribute values 114(1) . . . 114(N) contained therein from data source 112(1), the collection module 210 is configured to retrieve attributes 110(1) . . . 110(N) and the respective attribute values 116(1) . . . 116(N) contained therein from data source 112(2), and the collection module 210 is configured to retrieve attributes 110(1) . . . 110(N) and the respective attribute values 118(1) . . . 118(N) contained therein from data source 112(M). As described above, part of the attribute information collected by the collection module 210 may include an instance of an attribute that does not contain any attribute value, but rather, the attribute information collected indicates that the instance of the attribute contains a missing attribute value (e.g., missing attribute value 114(3)).

At 306, data quality issues are identified amongst the collected attribute information. That is, the issue identification module 212 is configured to use one or more algorithms to determine whether a potential data quality issue exists amongst attribute values for a particular attribute.

In various examples, to determine whether there is a data quality issue of the first type (e.g., a missing attribute value), the issue identification module 212 is configured to determine whether a data source's instance of an attribute contains a missing value (e.g., is "null"). The issue identification module 212 can determine, via a comparison (e.g., a mere presence or absence of data values), that other data sources contain attribute values for the same attribute. Based on a determination that the other data sources contain attributes values for the same attribute, the issue identification module 212 determines that the data source's instance of the attribute should likely also contain an attribute value, and therefore, a potential data quality issue of the first type (e.g., a missing attribute value) exists for the data source's instance of the attribute.

In various examples, the issue identification module 212 is configured to use an attribute value comparison algorithm to compare attribute values and identify data quality issues of the second type (e.g., an inconsistent attribute value). That is, since an attribute value comprises one or more characters and/or symbols, the issue identification module 212 can compare strings or sequences of the characters or symbols (e.g., using an exact string matching algorithm, using an approximate string matching algorithm to account for non-substantial differences, etc.) and determine, based on the comparison, whether a particular attribute value (e.g., string) contained in a data source's instance of the attribute fails to substantially match other attribute values contained in other data sources' instances of the same attribute. A pre-defined similarity threshold associated with an acceptable number of different characters and/or symbols can be used to determine a substantial or non-substantial match. Based on a determination that the data source's instance of the attribute value fails to substantially match other attribute values contained in other data sources' instances of the same attribute, the issue identification module 212 determines that there is a potential data quality issue of the second type (e.g., an inconsistent value) for the data source's instance of the attribute.

In various implementations, as part of the determination process, the issue identification module 212 can determine a most commonly occurring attribute value amongst the multiple different data sources (e.g., determine how many times each attribute value occurs and select the attribute value with a highest number as the most commonly occurring attribute value, or as the "consistent" attribute value). Accordingly, any attribute value that does not exactly match or substantially match the most commonly occurring attribute value is determined to be an "inconsistent" attribute value.

In various implementations, a user of a client device 222 can define the consistent attribute value, and the issue identification module 212 can determine attribute values that are inconsistent with the user-defined consistent attribute value.

In various implementations, as part of the determination process, the issue identification module 212 can determine a majority attribute value amongst the multiple different data sources (e.g., determine if a common attribute value exists across a majority of the data sources). Accordingly, any attribute value that does not exactly match or substantially match the majority attribute value is determined to be an "inconsistent" attribute value.

In various implementations, as part of the determination process, the issue identification module 212 can determine that an attribute value is an outlier, and therefore, is an inconsistent attribute value. For example, the issue identification module 212 can determine that an attribute value is not consistent with any one of multiple different attribute values that are acceptable, or consistent, because they individually satisfy a minimum threshold (e.g., the attribute value must be contained in at least ten percent of the instances of the attribute stored across the multiple data sources). Therefore, the attribute value is determined to be an outlier because it is not consistent with a number (e.g., one, two, three, four, etc.) of other attribute values determined to be acceptable, or consistent.

In at least one example, the issue identification module 212 considers translations of attribute values prior to identifying potential data quality issues of the second type. For instance, even though a first text string written in English does not match a second text string written in Spanish, the first text string and the second text string may be consistent with respect to one another (e.g., have the same meaning). Consequently, the issue identification module 212 is configured to determine when attribute values being compared are written in different languages and to perform a translation, or to locate a translation, of at least one of the attribute values (e.g., a machine-translation) so the attribute values are in the same language before comparing the attribute values to determine if they are inconsistent.

In at least one further example, the issue identification module 212 considers conversions of attribute values prior to identifying potential data quality issues of the second type. For instance, even though a first number in a first metric (kilograms) does not match a second number in a second metric (pounds or "lbs."), the first number and the second number may be consistent with respect to one another. Consequently, the issue identification module 212 is configured to determine when attribute values being compared are provided using different metrics or units, and a conversion can be made to at least one attribute value prior to making a comparison to determine an inconsistency.

In various examples, the issue identification module 212 is configured to use a language analysis algorithm to identify data quality issues of the third type (e.g., an un-translated attribute value). That is, the issue identification module 212 is configured to identify a target language for a data source (e.g., English for a United States-based data source, Spanish for a Spain-based data source, etc.) and determine whether a data source's instance of an attribute contains an attribute value that is not written in the target language of the data source. Based on a determination that the data source's instance of the attribute is not written in the target language of the data source, the issue identification module 212 determines that there is a potential data quality issue of the third type (e.g., an un-translated attribute value) for the data source's instance of the attribute.

At 308, a graphical user interface that visually distinguishes (e.g., via use of different colors, via use of different shapes, via use of different fill patterns, etc.) between an attribute that has a data quality issue from other attributes that do not have a data quality issue is output. For instance, the presentation module 214 is configured to present each of the attributes 110(1) . . . 110(N) defined for the object (e.g., a "title" of the object, a "weight" of the object, a "height" of the object, a "category" of the object, a "manufacturer" of the object, etc.) and visually distinguish an attribute for which a data quality issue was identified, from other attributes for which no data quality issues were identified. In some examples, the presentation module 214 is configured to visually distinguish the attributes based on types of data quality issues. The presentation module 214 is also configured to present, based on a type of data quality issue, options that, upon selection by a user of the client device 222, provide instructions for the resolution module 216 to take action to resolve the data quality issue. Examples of the graphical user interface are further described herein with respect to FIGS. 4-6.

At 310, instructions to resolve a data quality issue are received. For instance, the resolution module 216 receives, based on a user selection of an option, instructions to implement an action that resolves the data quality issue. The options are further described herein with respect to the example graphical user interfaces of FIGS. 4-6.

At 312, the data quality issue is resolved based on the instruction. For example, the resolution module 216 is configured to copy an attribute value (e.g., the most commonly occurring attribute value) from other data source(s) to resolve a data quality issue of the first type (e.g., a missing attribute value). In another example, the resolution module 216 is configured to replace an inconsistent attribute value currently contained in an instance of an attribute with a replacement attribute value (e.g., the most commonly occurring attribute value, the majority attribute value, etc.) from other data source(s) to resolve a data quality issue of the second type (e.g., an inconsistent attribute value). In yet another example, the resolution module 216 is configured to translate an attribute value to resolve a data quality issue of the third type (e.g., an un-translated attribute value). To translate the attribute value, the resolution module 216 can locate a translation of the attribute value for an attribute that already exists in another data source's instance of the attribute. Or, the resolution module 216 can perform a machine-translation of the attribute value (e.g., if no translation exists). In an event, more than one translation exists for the attribute value, the resolution module 216, in accordance with a rule defined by the rules modules 220, can determine whether the translations are human-translations or machine-translations and select a human-translation since it is likely to be a more accurate translation.

Accordingly, the example process 300 described in FIG. 3, as further described herein with respect to the example graphical user interfaces of FIGS. 4-6, provides an effective and efficient way to surface data quality issues identified across multiple data sources for a user to review. Based on the review, the user can determine if the data quality issues should be resolved, and if so, information from other data sources that already exists can quickly be located and used to resolve the data quality issues (e.g., copy an existing attribute value to a missing attribute value, replace an inconsistent attribute value with an existing consistent attribute value, replace an un-translated attribute value with a translated attribute value). Consequently, the data consumption experience across multiple different data sources is improved. For example, as illustrated in FIG. 2, data access devices 108(1) associated with a first data source (e.g., located in a first geographical region with a first language most commonly spoken) can consume the same data as data access devices 108(2) associated with a second source (e.g., located in a second geographical region with a second language most commonly spoken). In various examples, the data access devices 108 can comprise devices associated with customers (e.g., purchasers of the object via URLs of the respective online electronic marketplaces). In other examples, the data access devices 108 can comprise devices associated with other consumers of the data, such as a manager or an employee of a warehouse or a distribution center operated by an entity that stores object data.

In various implementations, the permissions module 218 is configured to determine who (e.g., which users) are able to view and/or resolve data quality issues. The permissions module 218 is further described herein with respect to the example process of FIG. 7.

In various implementations, the rules module 220 is configured to define (e.g., based on user instruction) rules to control how the data quality issues are identified and/or resolved. Rules can be defined for multiple data sources or individual data sources. Rules can also be defined for multiple attributes or individual attributes. Even further, rules can be defined for multiple objects (e.g., a category of objects) or individual objects. For example, a rule can require that a most commonly occurring attribute value be (i) copied to resolve a missing attribute value and/or (ii) used as a replacement to resolve an inconsistent attribute value. In another example, a rule can require that a particular data source (e.g., a main data source that typically contains the highest quality data) be used (i) as a source of an attribute value to be copied to a missing attribute value, (ii) as a source of a replacement attribute value to replace an inconsistent attribute value, and/or (iii) as a source of a translated attribute value to replace an un-translated attribute value (e.g., if the target language is common). The rules module 220 is further described herein with respect to the example processes of FIGS. 7 and 8.

FIG. 4 is a diagram showing an example graphical user interface 400 that can be presented via a display of a device (e.g., a client device 222). The presentation module 214 is configured to generate the graphical user interface 400, which visually distinguishes between an attribute associated with a first type of data quality issue (e.g., an attribute with a missing attribute value) and other attributes for which no data quality issues have been identified. As described above, a query can identify an object via the use of an object identifier (ID) 402. After the attribute information for the object is collected from multiple different data sources and after the data quality issues are identified, as described above, the graphical user interface 400 is configured to separately present the attributes 404(1) . . . 404(15) so a user of client device 222 can view the attribute information from multiple different data sources in a single place and in a unified manner. For example, attribute 404(1) may be an object "title" attribute, attribute 404(2) may be an object "manufacturer" attribute, attribute 404(3) may be an object "weight" attribute, and so forth.

Once the attribute information is collected, the issue identification module 212 determines that at least one data source is missing an attribute value for attribute 404(9). In contrast, the issue identification module 212 is unable to identify any data quality issues for the other attributes. The presentation module 214 is configured to visually distinguish the attribute 404(9) from the other attributes so the viewer can quickly locate attribute 404(9) and review further details to determine if the identified data quality issue (e.g., a potential issue) should be resolved. As an example, attribute 404(9) can be presented in a color (e.g., yellow) defined to represent the first type of data quality issue (e.g., a missing attribute value) while the other attributes are presented in an original color (e.g., green) indicating that no data quality issues have been identified. Upon selection of the attribute 404(9) by a user viewing the presented information (e.g., via the cursor), the graphical user interface 400 is configured to display the collected information about the attribute 404(9) in a detail section 406. For instance, identification of the data sources from which the attribute information was collected can be presented (e.g., data sources that support Australia, Spain, United States, and United Kingdom). The target languages for the respective data sources and/or geographical regions can be presented (e.g., English, Spanish, English, English, etc.). The values that are respectively stored in association with the attribute 404(9) (e.g., an object "package quantity" attribute) can be presented.

As illustrated in FIG. 4, the first data source (supporting Australia) is missing an attribute value for attribute 404(9), while the second data source (supporting Spain), the third data source (supporting the United States), and the fourth data source (supporting the United Kingdom) sources have an attribute value of "1" for the attribute 404(9). As a result, the presentation module 214 is configured to present, in association with the first data source, a selectable option to copy 408 an existing attribute value from another data source to the attribute 404(9) for the first data source so there is no longer a missing attribute value. In one example, the attribute value copied complies with a rule such as copying the most commonly occurring attribute value amongst the data sources (e.g., in case the multiple different data sources store more than one attribute value for the same attribute). In this example, the most commonly occurring attribute value can automatically be copied upon selection of the option to copy 408. In another example, the viewer can locate and select an individual attribute value to be copied from another data source to the attribute 404(9) for the first data source so there is no longer a missing attribute value.

FIG. 5 is a diagram showing another example graphical user interface 500 that can be presented via a display of a device (e.g., a client device 222). The graphical user interface 500 illustrates the same attributes 404(1) . . . 404(15) that are illustrated in FIG. 4. However, the graphical user interface 500 generated by the presentation module 214 visually distinguishes between an attribute 404(7) associated with a second type of data quality issue (e.g., an attribute with an inconsistent attribute value) and other attributes for which no data quality issues have been identified. Similar to the discussion of FIG. 4, the presentation module 214 is configured to visually distinguish the attribute 404(7) from the other attributes so the viewer can quickly locate attribute 404(7) and review further details to determine if the identified data quality issue should be resolved. As an example, attribute 404(7) can be presented in a color (e.g., red) defined to represent the second type of data quality issue (e.g., an inconsistent attribute value). Upon selection of the attribute 404(7) by a user, the graphical user interface 500 is configured to display the collected information about the attribute 404(7) in a detail section 502. For instance, the attribute values that are respectively stored in association with the attribute 404(7) (e.g., an object "category" attribute) can be presented.

As illustrated in FIG. 5, the first data source (supporting Australia) has an attribute value of "peripheral device" for attribute 404(7), the second data source (supporting Spain) has an attribute value of "la impresora" for attribute 404(7) (e.g., a Spanish translation of "printer"), the third data source (supporting the United States) has an attribute value of "printer" for attribute 404(7), and the fourth data source (supporting the United Kingdom) has an attribute value of "electronics" for attribute 404(7). Consequently, the issue identification module 212 determines that the first data source and the fourth data source have a data quality issue of the second type (e.g., an inconsistent attribute value) because the attribute values are not consistent with other attribute values, or the most commonly occurring attribute value (e.g., "printer", or a translation of "printer"). In this example, the most commonly occurring attribute value may be a higher quality value because it more narrowly describes the category compared to the more generic terms such as "peripheral device" or "electronics". As a result, the presentation module 214 is configured to present, in association with the first data source and the fourth data source, a selectable option to replace 504 the inconsistent attribute values with an existing, consistent attribute value from another data source. In one example, the attribute value used to replace the inconsistent attribute values complies with a rule that uses the most commonly occurring attribute value amongst the data sources as a replacement. In this example, the most commonly occurring attribute value can automatically be used as a replacement (e.g., copied) upon selection of the option to replace 504. In another example, the viewer can locate and select an individual attribute value from another data source to be used as a replacement so the first data source and the fourth data source no longer have inconsistent attribute values.

FIG. 6 is a diagram showing yet another example graphical user interface 600 that can be presented via a display of a device (e.g., a client device 222). The graphical user interface 600 illustrates the same attributes 404(1) . . . 404(15) that are illustrated in FIG. 4 and FIG. 5. However, the graphical user interface 600 generated by the presentation module 214 visually distinguishes between an attribute 404(12) associated with a third type of data quality issue (e.g., an attribute with an attribute value that has not been translated to a target language) and other attributes for which no data quality issues have been identified. Similar to the discussion of FIG. 4, the presentation module 214 is configured to visually distinguish the attribute 404(12) from the other attributes so the viewer can quickly locate attribute 404(12) and review further details to determine if the identified data quality issue should be resolved. As an example, attribute 404(12) can be presented in a color (e.g., blue) defined to represent the third type of data quality issue (e.g., an un-translated attribute value). Upon selection of the attribute 404(12) by a viewer, the graphical user interface 600 is configured to display the collected information about the attribute 404(12) in a detail section 602. For instance, the attribute values that are respectively stored in association with the attribute 404(12) (e.g., an object "finishing" attribute associated with a printer) can be presented.

As illustrated in FIG. 6, each of the first data source (supporting Australia), the second data source (supporting Spain), the third data source (supporting the United States), and the fourth data source (supporting United Kingdom) has an attribute value of "color and staple" for attribute 404(12). While this attribute value is correct for the first data source, the third data source, and the fourth data source because their target language is "English", this attribute value constitutes a data quality issue for the second data source because it has not been translated to its target language "Spanish". Consequently, the issue identification module 212 analyzes the language the attribute value is written in to determine that the second data source has a data quality issue of the third type (e.g., an un-translated attribute value) and the presentation module 214 is configured to present, in association with the second data source, a selectable option to translate 604 the current attribute value (e.g., from "color and staple" to "el color y la grapa"). To translate the attribute value, the resolution module 216 can locate a translation of the attribute value for an attribute that already exists in another data source's instance of the attribute (e.g., if a source associated with Mexico or Argentina already includes a translation then the translation can be copied in association with the selection of the option to translate 604). Or, the resolution module 216 can perform a machine-translation of the attribute value (e.g., if no translation exists).

In various examples, the presentation module 214, in addition to visually distinguishing attributes with data quality issues from those without, can visually distinguish between attributes with data quality issues based on types so that a viewer can easily identify which types of data quality issues potentially exist for an attribute (e.g., yellow color for first type, red color for second type, blue color for third type, etc.). Moreover, multiple different attributes associated with multiple different types of data quality issues can be presented in a single graphical user interface (e.g., the GUIs of FIGS. 4-6 can be combined and an individual detail section can be displayed in response to a selection of a corresponding attribute).

In various examples, an attribute can have more than one (e.g., two, three, etc.) type of data quality issue associate with it. For instance, a first data source may contain a missing attribute value for an attribute and a second data source may contain an inconsistent attribute value for the same attribute. Or a resolution may require that a replacement attribute value for an inconsistent attribute value needs to be copied and translated for an individual data source. Accordingly, an attribute can be presented in association with more than one visual distinction (e.g., split colors—yellow and red).

FIG. 7 is a flow diagram showing an illustrative process 700 to determine whether a user is authorized to resolve a data quality issue and to determine whether a rule prevents a resolution of the data quality issue (e.g., whether a new attribute value violates a rule).

At 702, an attribute that has a data quality issue is mapped to a user identification (ID). For example, prior to submitting a query to the data quality management system 102, a user may be asked to provide credentials, via a client device 222, that authorize and identify the user. In another example, the user may be asked to provide the credentials upon selection of an attribute, as described above with respect to FIGS. 4-6. In various implementations, the permissions module 218 associates a user ID with authorization to resolve data quality issues. Authorizations can be defined for multiple data sources or individual data sources. Authorizations can also be defined for multiple attributes or individual attributes. Even further, authorizations can be defined for multiple objects (e.g., a category of objects) or individual objects.

At decision 704, it is determined if the user ID is authorized to resolve the data quality issue. In various examples, the permissions module 218 defines the authorization based on user input received from an "owner" of an attribute. The owner of an attribute decides which individual users, or which group of users, can resolve a data quality issue for an individual attribute. At least one factor considered when making this decision may include a type of subject matter expert. For example, an owner of an attribute associated with hazardous materials (HAZMAT) may decide that only HAZMAT experts can (i) resolve a data quality issue (e.g., change an attribute value) associated with the attribute or (ii) define a rule to be used in association with resolving data quality issues associated with the attribute.

If "No" at decision 704, then at 706 the data quality management system 102 prevents an action from resolving the data quality issue. In some examples, only the attributes a user is authorized to resolve may be made selectable via the graphical user interface, while the other attributes the user is not authorized to resolve may be un-selectable. Moreover, subsets of the attributes may be grouped based on whether or not a user is authorized to resolve data quality issues (e.g., a first subset of attributes presented at the top of a graphical user interface may be selectable based on authorization for a user and a second subset of attributes presented below the first subset may not be selectable based the user not having authorization). Moreover, if the user is prevented from resolving a data quality issue for an attribute, the user can request that an owner of the attribute (i) be notified (e.g., via an email) of the data quality issue and/or (ii) switch the user's permission from unauthorized to authorized.

If "Yes" at decision 704, then at 708 the data quality management system 102 allows an action to resolve the data quality issue and the process continues to decision 710 where it is determined if a new attribute value (e.g., a copied attribute value, a replacement attribute value, etc.) violates a rule defined for the attribute. For instance, based on user input (e.g., received from an owner of an attribute), the rules module 220 can define attribute values that are acceptable (e.g., within a defined range of attribute values) or unacceptable (e.g., outside the defined range of attribute values). In a specific example, a rule associated with a "type of shipping" attribute can be defined that allows shipping by drone only if laws associated with a first geographical region supported by a first data source (allow drone shipping. Accordingly, this rule can be used to determine whether a new attribute value that indicates "drone shipping" is available can be stored in association with a data source's instance of an attribute (e.g., depending on whether the geographical region allows drone shipping).

If "Yes" at decision 710, then at 712 the data quality management system 102 prevents the new attribute value (e.g., a copied attribute value, a replacement attribute value, etc.) from being stored to resolve the data quality issue. Moreover, if the user is prevented from providing a new attribute value for the attribute, the user can request that an owner of the attribute be notified (e.g., via an email) of the potential data quality issue.

If "No" at decision 710, then at 714 the data quality management system 102 allows the new attribute value to be stored to resolve the data quality issue.

FIG. 8 is a flow diagram showing an illustrative process 800 to define rules that can subsequently be used to identify and resolve data quality issues for an object or for multiple different objects. The example process 800 can be implemented by the data quality management system 102 as an alternative, or subsequent, to the example process 300 illustrated in FIG. 3. For example, on-going data quality issues that are common to a category of objects can be identified and resolved without the user having to submit an individual query for each object and without the user having to interact with multiple graphical user interfaces to resolve the data quality issue for multiple objects.

At 802, a rule is established by the rules module 220 based on user input. The rule can define a condition that constitutes a data quality issue and an action that can be implemented to resolve the data quality issue. The action can continually be implemented upon detection of the condition across various data sources and/or various objects. For example, the rule can define that if an instance of a particular attribute (any instance) contains a missing attribute value (e.g., the condition), then another attribute value designated by the rule is to be copied to the instance of the particular attribute that contains the missing attribute value (e.g., the action). In another example, the rule can define that if an instance of a particular attribute (any instance) currently contains a particular attribute value that is inconsistent (e.g., the condition), then a data source designated by the rule is to be used to copy a replacement attribute value to the instance of the particular attribute that contains the particular attribute value that is inconsistent. In these examples, the particular attribute can be specific to an individual object or can be common to multiple objects. Accordingly, the rule can be defined to apply to an individual object or multiple objects (e.g., objects that are similar, objects that belong to a same category, objects that are produced by a same manufacturer, objects that are provided by a same vendor, etc.). Object identifications can be used to create a group of objects to which the rule is to be applied. Similarly, the rule can be defined to apply to an individual data source or multiple data sources (e.g., as identified by the user input that creates the rule). Data source identifications can be used to create a group of data sources to which the rule is to be applied. In some implementations, the user is provided with an option to define the rule after he or she has resolved the same data quality issue (e.g., via the example GUIS of FIGS. 4-6) a threshold number of times (e.g., two, three, five, ten, etc.).

At 804, the condition defined by the rule is detected (e.g., data quality issues are identified). For instance, the issue identification module 212 can actively and continuously crawl the database 106 and monitor the object data stored in the database 106 to detect an occurrence of the condition defined by the rule.

At 806, a preview of an effect of the rule can optionally be presented to a user that defined the rule. For instance, the presentation module 214 can present information that illustrates the effect of the action being taken. Consequently, the user can review the effect of the rule and either accept, reject, or edit (e.g., modify) the rule for more tailored results. An example preview of an effect of the rule is illustrated in the example GUI of FIG. 9.

At 808, actions defined by the rule are implemented to resolve the data quality issues. In various examples, this is done automatically with limited or no further user input other than the input that defines the rule and/or an acceptance of application of the rule (e.g., after the effect is previewed as discussed with respect to operation 806). In some instances, if resolution of a data quality issue in accordance with a rule conflicts with another rule defined for an attribute (e.g., the new attribute value is outside a range of attribute values defined for an attribute by the other rule), a priority order can be used to determine which rule has priority. The priority order can be based on owners of an attribute. For example, a first owner of the attribute that authors a first rule can be designated to have a higher priority than a second owner of the attribute that authors a second rule. Further, the priority order can be determined based on subject matter expertise of the various owners (e.g., retail expertise, item detail page formatting expertise, warehouse management expertise, HAZMAT expertise, etc.).

Consequently, via the definition of a rule, data quality can be improved without requiring the user to have to continually submit a query for an individual object and view the information about the individual object before resolving any data quality issue. Rather, the user is able to create a rule that resolves the data quality issue for an attribute on an ongoing basis, across multiple objects and/or across multiple data sources. In one example, a rule can be particularly useful when a new data source is created with objects and attributes, as the rule can be used to replicate existing attribute values from another data source into the new data source.

FIG. 9 is a diagram showing an example graphical user interface 900 that can be presented via a display of a device (e.g., a client device 222). The presentation module 214 is configured to generate the graphical user interface 900 in response to a rule being defined by a user so that the user can preview an effect of the rule prior to the system effecting changes to attribute values.

For instance, the graphical user interface 900 previews data sources 902 that are to be affected by the rule, object identifications 904 to be affected by the rule, a category 906 of the objects affected by the rule (e.g., designated by the rule), the attribute 908 common to the object(s) affected by the rule (e.g., designated by the rule), the current attribute value 910 that constitutes the data quality issue (e.g., the condition defined by the rule), and the new attribute value 912 resulting from an action defined by the rule to resolve the data quality issue.

In the example of FIG. 9, when creating a rule, a user can designate a category of objects (e.g., Diapers produced by Company XYZ) or alternatively identify the objects that separately (e.g., object ID 1234 may be associated with a first type of diapers produced by Company XYZ, object ID 1235 may be associated with a second type of diapers produced by Company XYZ, object 1236 may be associated with a third type of diapers produced by Company XYZ). The user may be creating the rule because Company XYZ is changing the quantity of diapers (e.g., an attribute) per package from "12" to "24", and this change needs to be effected across all data sources or a subset of data sources identified by the user.

Consequently, after defining the rule, the presentation module 214 can configure the example GUI 900 to be presented to the user. The preview allows a user to evaluate the effect of the rule. For instance, the user can preview: the data sources 902 affected, the objects 904 affected, the attribute 908 for which the rule is defined, the current attribute value 910 that constitutes the data quality issue (e.g., as defined by the condition of the rule), and the new attribute value 912 that exists after the actions are taken to resolve the data quality issue. Subsequently, the user is presented with options to accept 914 the effect of the rule (e.g., change the attributes values), reject the effect of the rule 916 (e.g., not change the attribute values), or edit the rule 918 (e.g., limit or expand the data sources affected, limit or expand the object identifications that are accepted, etc.).

FIG. 10 is a flow diagram showing an illustrative process 1000 that matches attribute values of an attribute across a first object and a second object to locate a translation of an attribute value in a target language. The example process 1000 can be implemented in a situation where a human translation of an attribute value (e.g., long, detailed description of an attribute) exists, and thus, using resources to locate the human translation provides a higher quality translation compared to performing a machine translation.

At 1002, it is determined that a translation of an attribute value is not available in a target language for an attribute of a first object. For example, each of multiple data sources associated with the target language may not contain a translation of the attribute value in the target language.

At 1004, the attribute of the first object is mapped to a same attribute of the second object that contains the attribute value. The resolution module 216 can be configured to use object identifications to determine the second object. For example, object identifications may be grouped based on a category, where the category includes at least some attributes that are common to the objects in the group.

At 1006, a translation of the attribute value stored in association with the second object is located. For example, the resolution module 216 can determine a data source associated with the target language to find the translation of the attribute value.

At 1008, the translation is used to resolve the data quality issue associated with the first object. That is, the translation can be used to replace the un-translated attribute value of the attribute of the first object.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
a memory that stores instructions that are executable by the one or more processors to cause the system to perform operations comprising:
receiving a query that identifies an object;
collecting, based at least in part on the query, first data associated with the object from a first data source, the first data including an attribute defined for the object and the first data source containing the first data associated with the object for first service calls received from a first group of devices;
collecting, based at least in part on the query, second data associated with the object from a second data source, the second data including the attribute defined for the object and the second data source containing the second data associated with the object for second service calls received from a second group of devices, the second data different than the first data;
comparing the first data to the second data to identify a data quality issue associated with the attribute, wherein the data quality issue includes one of:
a first type of data quality issue wherein the attribute collected from the first data source contains a first attribute value and the attribute collected from the second data source contains a missing attribute value;

a second type of data quality issue wherein the attribute collected from the first data source contains the first attribute value that is inconsistent with a second attribute value of the attribute collected from the second data source; or a third type of data quality issue wherein the attribute collected from the first data source contains the first attribute that is untranslated to a target language;

causing a graphical user interface to be output, the graphical user interface visually distinguishing the attribute associated with the data quality issue from other attributes defined for the object that are not associated with a data quality issue and the graphical user interface providing an option to resolve the data quality issue, wherein the graphical user interface visually distinguishes the attribute from other attributes by presenting the attribute as a first graphical element having a first color and presenting at least one of the other attributes as a second graphical element having a second color that is different than the first color;

receiving, based at least in part on a user selection of the option, an instruction to resolve the data quality issue; and taking an action to resolve the data quality issue based on the instruction, wherein the action includes one of:

copying the first attribute value to the attribute collected from the second data source that contains the missing attribute value in an event the data quality issue is of the first type of data quality issue; or replacing the second attribute value with the first attribute value for the attribute collected from the second data source in an event the data quality issue is of the second type of data quality issue.

2. The system of claim 1, wherein:
the first data source contains the first data associated with the object for a first geographical region within which at least a portion of the first data is made available to the first group of devices; and
the second data source contains the second data associated with the object for a second geographical region within which at least a portion of the second data is made available to the second group of devices.

3. The system of claim 1, wherein the first graphical element further has a first shape and the second graphical element further has a second shape that is different than the first shape.

4. The system of claim 1, wherein:
at least one first service call is associated with a request to present at least a portion of the first data via a first uniform resource locator (URL) in a first language; and
at least one second service call is associated with a request to present at least a portion of the second data via a second URL in a second language that is different than the first language.

5. The system of claim 1, wherein the first service calls comprise first requests to access the first data, and the second service calls comprise second requests to access the second data.

6. A method comprising:
collecting, from multiple different data sources, a plurality of attribute values for an individual attribute that is associated with an object, wherein each data source includes a plurality of attributes associated with the object, at least some of which contain attribute values;
identifying, by one or more processors, a first data quality issue associated with the individual attribute, the first data quality issue comprising one of:
a first type of data quality issue wherein the individual attribute contains a missing attribute value;
a second type of data quality issue wherein the individual attribute contains a first attribute value that is inconsistent with a second attribute value, the first attribute value is associated with a first data source and the second attribute value is associated with a second data source that is different than the first data source; or
a third type of data quality issue wherein the individual attribute contains an untranslated attribute value;
causing a graphical user interface to be output, the graphical user interface visually distinguishing the individual attribute from at least one other attribute of the plurality of attributes associated with the object that is without the first data quality issue, the graphical user interface presenting the individual attribute as a first graphical element having a first color and presenting the one other attribute as a second graphical element having a second color that is different than the first color;
receiving an instruction to resolve the first data quality issue;
determining a most commonly occurring attribute value of the plurality of attribute values; and
implementing an action, based at least in part on the instruction, to resolve the first data quality issue, the action comprising copying the most commonly occurring attribute value to an instance of the individual attribute that contains the missing attribute value.

7. The method of claim 6, wherein the individual attribute comprises a first individual attribute and the first data quality issue comprises the second type of data quality issue, the method further comprising:
replacing, as at least part of the action, the second attribute value with the most commonly occurring attribute value.

8. The method of claim 6, wherein the first data quality issue comprises the third type of data quality issue, the method further comprising translating, as at least part of the action, the untranslated attribute value to a target language.

9. The method of claim 6, wherein the first data quality issue comprises the third type of data quality issue, the method further comprising:
identifying a translation of the untranslated attribute value in a target language from the plurality of attribute values; and
replacing the untranslated attribute value with the translation.

10. The method of claim 6, wherein:
a third data source contains a third attribute value for a first geographical region within which first information about the object is made accessible to a first group of devices via a first uniform resource locator (URL); and
a fourth data source contains a fourth attribute value for a second geographical region within which second information about the object is made accessible to a second group of devices via a second URL, the first geographical region being different than the second geographical region and the first URL being different than the second URL.

11. The method of claim 10, wherein:
the first URL is configured to present the first information in a first language; and
the second URL is configured to present the second information in a second language that is different than the first language.

12. The method of claim 6, further comprising determining, prior to the resolving the first data quality issue, that a user that provided the instruction to resolve the first data quality issue is authorized to resolve the data quality issue.

13. The method of claim 6, further comprising determining, prior to implementing the action to resolve the first data quality issue, that a new attribute value complies with a rule defined for the individual attribute, the rule designating at least one acceptable attribute value and at least one unacceptable attribute value.

14. The system of claim 6, wherein the first graphical element further has a first shape and the second graphical element further has a second shape that is different than the first shape.

15. A system comprising:
one or more processors; and
a memory that stores instructions that are executable by the one or more processors to cause the system to perform operations comprising:
establishing a first rule that defines:
one or more objects or an object category
a condition that constitutes a data quality issue for an attribute contained by data sources, the attribute common to the one or more objects or the object category, the data quality issue comprising one of:
a first type of data quality issue wherein the attribute contains a missing attribute value:
a second type of data quality issue wherein the attribute contains a first attribute value that is inconsistent with a second attribute value, the first attribute value is associated with a first data source and the second attribute value is associated with a second data source that is different than the first data source; or
a third type of data quality issue wherein the attribute contains an untranslated attribute value; and
an action to change the attribute to resolve the data quality issue;
determining attribute values contained in a plurality of instances of the attribute across the data sources;
detecting an occurrence of the condition that constitutes the data quality issue;
determining that the action defined by the first rule conflicts with a second rule;
determining a priority order that indicates a first author of the first rule has priority over a second author of the second rule; and
implementing the action to change the attribute to resolve the data quality issue based at least in part on detecting the occurrence and the priority order.

16. The system of claim 15, wherein the data quality issue comprises the first type of data quality issue and the action comprises copying a new attribute value to an instance of the attribute that contains the missing attribute value.

17. The system of claim 15, wherein the data quality issue comprises the second type of data quality issue and the action comprises replacing the second attribute value with a new attribute value.

18. The system of claim 15, wherein the operations further comprise causing a preview of an effect of the first rule to be presented, the preview including data sources affected by the first rule and objects affected by the first rule.

19. The system of claim 18, wherein the operations further comprise implementing the action to change the attribute to resolve the data quality issue after a user accepts the effect of the first rule.

20. The system of claim 15, wherein the priority order is based at least in part on determining a first subject matter expertise associated with the first author and determining a second subject matter expertise associated with the second author.

* * * * *